United States Patent
Yoon et al.

(10) Patent No.: US 12,415,150 B2
(45) Date of Patent: Sep. 16, 2025

(54) COMPOSITE NONWOVEN FABRIC AND ARTICLE COMPRISING SAME

(71) Applicant: TORAY ADVANCED MATERIALS KOREA INC., Gyeongsangbuk-do (KR)

(72) Inventors: Do Kyung Yoon, Gyeongsangbuk-do (KR); Jin Il Jeong, Gyeongsangbuk-do (KR); Geung Sik Jeong, Gyeongsangbuk-do (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 458 days.

(21) Appl. No.: 17/914,521

(22) PCT Filed: Mar. 24, 2021

(86) PCT No.: PCT/KR2021/003639
§ 371 (c)(1),
(2) Date: Oct. 18, 2022

(87) PCT Pub. No.: WO2021/194248
PCT Pub. Date: Sep. 30, 2021

(65) Prior Publication Data
US 2023/0140087 A1    May 4, 2023

(30) Foreign Application Priority Data

Mar. 26, 2020 (KR) ................. 10-2020-0037061

(51) Int. Cl.
*B01D 53/22* (2006.01)
*B01D 39/16* (2006.01)
(Continued)

(52) U.S. Cl.
CPC .......... *B01D 39/1623* (2013.01); *B32B 5/022* (2013.01); *B32B 5/269* (2021.05);
(Continued)

(58) Field of Classification Search
CPC ........ B01D 39/1623; B01D 2239/0435; B01D 2239/0618; B01D 2239/0622;
(Continued)

(56) References Cited

U.S. PATENT DOCUMENTS

| 5,227,172 A | 7/1993 | Deeds |
| 5,908,598 A | 6/1999 | Rousseau et al. |

(Continued)

FOREIGN PATENT DOCUMENTS

| JP | 2002161467 A | 6/2002 |
| JP | 2005124777 A | 5/2005 |

(Continued)

OTHER PUBLICATIONS

KR 1020150079137 Machine translation (Year: 2015).*

(Continued)

*Primary Examiner* — Anthony R Shumate
(74) *Attorney, Agent, or Firm* — Snell & Wilmer L.L.P.

(57) ABSTRACT

A non-woven fabric composite and an article including the same are provided. The non-woven fabric includes an electrostatically treated meltblown non-woven fabric layer and a spunbond non-woven fabric layer on one or both sides thereof, and has a fine dust removal performance retention ratio, represented by Equation 1, of 80% or more:

Fine dust removal performance retention ratio (%)= (fine dust removal efficiency after accelerated aging treatment)/(fine dust removal efficiency before accelerated aging treatment)×100   [Equation 1]

wherein, in this equation, the fine dust is an aerosol containing sodium chloride dispersed in air, and the accelerated aging treatment refers to a case where the non-woven fabric composite is stored at a temperature of 70° C. for 3 days.

7 Claims, 1 Drawing Sheet

(51) Int. Cl.
  *B32B 5/02* (2006.01)
  *B32B 5/26* (2006.01)
  *D04H 3/007* (2012.01)
  *D04H 3/03* (2012.01)
  *D04H 3/16* (2006.01)
  *A62B 23/00* (2006.01)

(52) U.S. Cl.
  CPC .............. *D04H 3/007* (2013.01); *D04H 3/03* (2013.01); *D04H 3/16* (2013.01); *A62B 23/00* (2013.01); *B01D 2239/0435* (2013.01); *B01D 2239/0618* (2013.01); *B01D 2239/0622* (2013.01); *B01D 2239/0627* (2013.01); *B01D 2239/065* (2013.01); *B32B 2250/20* (2013.01); *B32B 2262/0253* (2013.01); *B32B 2307/718* (2013.01); *B32B 2571/00* (2013.01); *D10B 2321/022* (2013.01); *D10B 2401/00* (2013.01); *D10B 2505/04* (2013.01)

(58) Field of Classification Search
  CPC ...... B01D 2239/0627; B01D 2239/065; B32B 5/269; B32B 5/022; B32B 2250/20; B32B 2262/0253; B32B 2307/718; B32B 2571/00; D04H 3/007; D04H 3/03; D04H 3/16; A62B 23/00; D10B 2321/022; D10B 2401/00; D10B 2505/04
  See application file for complete search history.

(56) References Cited

U.S. PATENT DOCUMENTS

| | | |
|---|---|---|
| 5,919,847 A | 7/1999 | Rousseau et al. |
| 5,968,635 A | 10/1999 | Rousseau et al. |
| 5,976,208 A | 11/1999 | Rousseau et al. |
| 6,268,495 B1 | 7/2001 | Rousseau et al. |
| 6,375,886 B1 | 4/2002 | Angadjivand et al. |
| 6,969,484 B2 | 11/2005 | Horiguchi et al. |
| 8,529,671 B2 | 9/2013 | Sebastian et al. |
| 2005/0077646 A1 | 4/2005 | Akiba et al. |
| 2005/0079379 A1* | 4/2005 | Wadsworth ........ D04H 1/43838 428/684 |
| 2005/0193696 A1* | 9/2005 | Muller ................. B01D 46/543 55/486 |
| 2007/0130894 A1* | 6/2007 | Schultink ........... B01D 39/1623 55/381 |
| 2010/0139224 A1* | 6/2010 | Lim ..................... B01D 46/546 55/486 |
| 2011/0168024 A1 | 7/2011 | Veeser et al. |
| 2019/0075987 A1* | 3/2019 | Sauer ..................... B01D 39/18 |
| 2022/0072457 A1* | 3/2022 | Sauer ..................... B32B 5/269 |
| 2023/0140087 A1* | 5/2023 | Yoon ..................... D04H 3/007 55/528 |
| 2023/0347268 A1* | 11/2023 | Sauer ................. B01D 39/1623 |
| 2025/0020957 A1* | 1/2025 | Bae ................... G02F 1/133536 |

FOREIGN PATENT DOCUMENTS

| | | |
|---|---|---|
| KR | 1020030032574 A | 4/2003 |
| KR | 1020150079137 A | 7/2015 |
| KR | 1020180055551 A | 5/2018 |
| KR | 10-2228591 B1 | 3/2021 |

OTHER PUBLICATIONS

KR 1020030032574 Machine translation (Year: 2003).*
JPO; Office Action dated Dec. 18, 2023 in Application No. 2022-558253.
KIPO; Notice of Non-Final Office Action dated Aug. 11, 2020 in Application No. 10-2020-0037061.
KIPO; Notice of Allowance dated Feb. 23, 2021 in Application No. 10-2020-0037061.
KIPO; International Search Report and Written Opinion dated Jun. 25, 2021 in Application No. PCT/KR2021/003639.

* cited by examiner

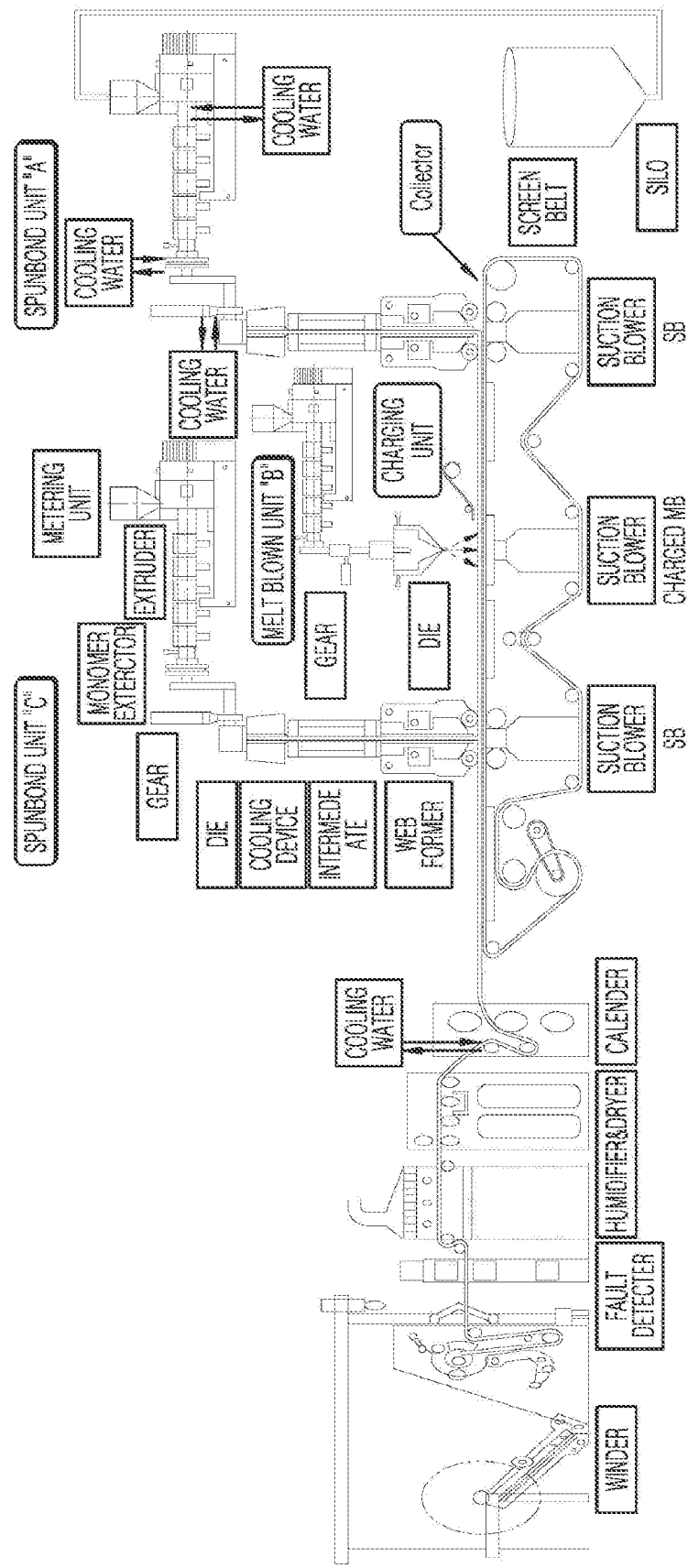

COMPOSITE NONWOVEN FABRIC AND ARTICLE COMPRISING SAME

TECHNICAL FIELD

A non-woven fabric composite and an article including the same are disclosed. Specifically, disclosed are a non-woven fabric composite having excellent mechanical properties and excellent fine dust removal function and an article including the same.

PRIOR ART

In the case of a mask for removing fine dust, the inner and outer skin materials and the filter material that filters fine dust in the center thereof are composed of a multi-layered composite.

As a filter layer, an electrostatically treated meltblown non-woven fabric is mainly used. Meltblown non-woven fabric has low dimensional stability due to low mechanical strength and high flexibility, such that structural deformation thereof easily occurs due to external impact or friction. Therefore, in order to protect the meltblown non-woven fabric layer and provide it with dimensional stability, a non-woven fabric with high mechanical properties, such as dimensional stability and tensile strength, are stacked on both sides or one side of the meltblown non-woven fabric layer to form a mask. Mainly, a spunbond non-woven fabric is laminated through a separate laminating process.

In addition, in the case of the spunbond non-woven fabric, which is generally applied as an inner and outer skin material on one or both sides of the electrostatically treated meltblown material, since the filament is thick and the pores thereof are large, there is almost no fine dust removal efficiency and only a function of imparting dimensional stability. Therefore, since fine dust is filtered only in the filter layer located at the center of the multi-layered non-woven fabric mask, the fine dust is intensively stacked on the filter layer and thus the filtering efficiency decreases with time of use. In particular, in industrial sites where masks must be worn for a long time, this problem may affect the respiratory safety of users.

In addition, since the non-woven fabric used as the inner and outer skin layer is bonded by ultrasonic welding along the outline of the mask, the structure of the electrostatically treated meltblown non-woven fabric, which constitutes the inner layer, is changed during the welding process, such that the filtering performance may be deteriorated.

DESCRIPTION OF EMBODIMENTS

Technical Problem

One embodiment of the disclosure provides a non-woven fabric composite having excellent mechanical properties and excellent fine dust removal function.

Another embodiment of the disclosure provides an article including the non-woven fabric.

Technical Solution to Problem

One aspect of the disclosure provides a non-woven fabric composite including an electrostatically treated meltblown non-woven fabric layer and a spunbond non-woven fabric layer on one or both sides thereof, a fine dust removal performance retention ratio is 80% or more, wherein the fine dust removal performance retention ratio is represented by Equation 1:

Fine dust removal performance retention ratio (%)=
(fine dust removal efficiency after accelerated
aging treatment)/(fine dust removal efficiency
before accelerated aging treatment)×100    [Equation 1]

wherein, in this equation, the fine dust is an aerosol containing sodium chloride dispersed in air, and the accelerated aging treatment refers to a case where the non-woven fabric composite is stored at a temperature of 70° C. for 3 days.

The non-woven fabric composite may have the pressure loss retention ratio, represented by Equation 2, of 90% or more:

Pressure loss retention ratio (%)=(pressure loss after
accelerated aging treatment)/(pressure loss
before accelerated aging treatment)×100    [Equation 2]

wherein, in this equation, the pressure loss is measured using an aerosol containing sodium chloride dispersed in air, and the accelerated aging treatment refers to a case where the non-woven fabric composite is stored at a temperature of 70° C. for 3 days.

The non-woven fabric composite may have a fine dust removal rate of 18% to 99% after the accelerated aging treatment.

The electrostatically treated meltblown non-woven fabric layer and the spunbond non-woven fabric layer may each independently include a non-conductive polymer, wherein the non-conductive polymer may include polyolefin, polystyrene, polycarbonate, polyester, polyamide, a copolymer thereof, or a combination thereof.

The amount of the electrostatically treated meltblown non-woven fabric layer may be 3 parts by weight to 50 parts by weight based on 100 parts by weight of the total weight of the non-woven fabric composite.

Another aspect of the disclosure provides an article including the non-woven fabric composite.

The article may be a mask for removing fine dust, a filter for an air purifier, or a filter for an air conditioner.

Advantages Effects of Disclosure

The non-woven fabric composite according to an embodiment of the disclosure can be applied as a material for filtering fine particles in air.

In addition, when the non-woven fabric composite is combined with the electrostatically treated meltblown filter layer used as the existing mask filter layer, the contamination of the filter layer can be prevented and thus, the lifespan can be increased, and the dimensional stability is excellent, and since the filter layer is formed as a multilayer, the performance and the removal efficiency stability of the entire mask can be increased.

In addition, the non-woven fabric composite can be used for the purpose of removing various kinds of dust, fine dust, bacteria, etc., and can be applied to, in addition to health masks, various household-, vehicle-, and industrial air conditioners and air purifiers which require air purification.

BRIEF DESCRIPTION OF DRAWING

FIG. 1 is a view schematically showing an apparatus for manufacturing a non-woven fabric composite used for continuously manufacturing a non-woven fabric composite according to an embodiment.

MODE OF DISCLOSURE

Hereinafter, a non-woven fabric composite according to an embodiment will be described in detail.

The term "non-woven fabric composite" used herein refers to a non-woven fabric laminate manufactured according to such a method that two or more kinds of non-woven fabrics are prepared by using a single continuous process and thus integrally formed, not a non-woven fabric laminate manufactured through a separate laminating (bonding) post-process after two or more kinds of non-woven fabrics are individually prepared. The term "non-woven fabric composite" may also be referred to as a "monolithic non-woven fabric." The non-woven fabric composite is characterized in that compared to the non-woven fabric laminate, the inter-layer bonding is strong, and the dimensional stability and the filtration performance are excellent.

In addition, throughout the present specification, the "electrostatically treated meltblown non-woven fabric layer" may indicate a layer that is manufactured by a continuous process when manufacturing a non-woven fabric composite. In an embodiment, the "electrostatically treated meltblown non-woven fabric layer" may be manufactured by sequentially or simultaneously performing "preparation of meltblown non-woven fabric" and "electrostatical treatment" in a continuous process.

The non-woven fabric composite according to an embodiment includes an electrostatically treated meltblown non-woven fabric layer and a spunbond non-woven fabric layer on one or both sides thereof.

A plurality of non-woven fabrics included in the non-woven fabric composite may be bonded to each other by thermal fusion instead of ultrasonic fusion.

The non-woven fabric composite may have a fine particle collection function due to the inclusion of an electrostatically treated meltblown non-woven fabric layer. However, since a spunbond-meltblown multilayer non-woven fabric of the related art has an average pore size of several to several tens of micrometers (μm), the function of removing fine particles having the level of 0.1 μm to 0.6 μm does not exist.

In addition, the non-woven fabric composite has a fine dust removal performance retention ratio of 80% or more, and the fine dust removal performance retention ratio is represented by Equation 1:

Fine dust removal performance retention ratio (%)=
(fine dust removal efficiency after accelerated
aging treatment)/(fine dust removal efficiency
before accelerated aging treatment)×100   [Equation 1]

wherein, in this equation, the fine dust is an aerosol containing sodium chloride dispersed in air, and the accelerated aging treatment refers to a case where the non-woven fabric composite is stored at a temperature of 70° C. for 3 days.

The fine dust removal performance retention ratio of 80% or more means that the filtration performance of the non-woven fabric composite is maintained high for a long time.

The non-woven fabric composite may have the pressure loss retention ratio, represented by Equation 2, of 90% or more:

Pressure loss retention ratio (%)=(pressure loss after
accelerated aging treatment)/(pressure loss
before accelerated aging treatment)×100   [Equation 2]

wherein, in this equation, the pressure loss is measured using an aerosol containing sodium chloride dispersed in air, and the accelerated aging treatment refers to a case where the non-woven fabric composite is stored at a temperature of 70° C. for 3 days.

The pressure loss retention ratio of 90% or more means that the dimensional stability (i.e., structural stability) of the non-woven fabric composite is maintained high for a long time.

The non-woven fabric composite may have a fine dust removal rate of 18% to 99% after the accelerated aging treatment. When the fine dust removal rate after the accelerated aging treatment is within the above range, the filtration performance, dimensional stability, and productivity of the non-woven fabric composite may all be maintained high.

The electrostatically treated meltblown non-woven fabric layer and the spunbond non-woven fabric layer may each independently include a non-conductive polymer.

The non-conductive polymer may include polyolefin, polystyrene, polycarbonate, polyester, polyamide, a copolymer thereof, or a combination thereof. The polyolefin may include polyethylene, polypropylene, poly-4-methyl-1-pentene, polyvinyl chloride, or a combination thereof.

The polyester may include polyethylene terephthalate, polylactic acid, or a combination thereof.

The electrostatically treated meltblown non-woven fabric layer and the spunbond non-woven fabric layer may each independently further include an additive.

The additives may include pigments, light stabilizers, primary antioxidants, secondary antioxidants, metal deactivators, hindered amines, hindered phenols, metal salts of fatty acids, triester phosphites, phosphates, fluorine-containing compounds, nucleating agents, or combinations thereof.

Also, in an embodiment, the antioxidant may function as a charge enhancer. Charge enhancers available herein may include thermally stable organic triazine compounds, oligomers or combinations thereof, and these compounds or oligomers may further contain at least one nitrogen atom in addition to the nitrogen in the triazine ring.

For example, a charge enhancer for the purpose of improving electrification characteristics is disclosed in U.S. Pat. Nos. 6,268,495, 5,976,208, 5,968,635, 5,919,847, and 5,908,598. For example, the charge enhancers may include a hindered amine-based additive, a triazine additive, or a combination thereof.

In an embodiment, the charge enhancer may include: poly[((6-(1,1,3,3-tetramethylbutyl)imino-1,3,5-triazine-2,4-diyl)((2,2,6,6-tetramethyl-4-piperidyl)imino)hexamethylene((2,2,6,6-tetramethyl-4-piperidyl)imino)](manufactured by BASF, CHIMASSORB 944); a mixture of 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine)(manufactured by BASF, CHIMASSORB 2020); or a combination thereof. The charge enhancer may be an N-substituted amino aromatic compound, for example, a tri-amino substituted compound such as 2,4,6-trianilino-p-(carbo-2'-ethylhexyl-1'-oxy)-1,3,5-triazine (manufactured by BASF, UVINUL T-150). Another example of the charge enhancer may be 2,4,6-tris-(octadecylamino)-triazine, also known as tristearyl melamine ("TSM").

The amount of the charge enhancer may be from 0.25 parts by weight to 5 parts by weight based on 100 parts by weight of the total weight of the meltblown non-woven fabric layer. When the amount of the charge enhancer is within this range, a high level of electrostatical performance targeted by the disclosure may be obtained, and good spinnability, high strength of the non-woven fabric, and low costs may be obtained. The non-woven fabric composite may further include generally known additives, such as a heat stabilizer and a weathering agent, in addition to the additives.

The amount of the electrostatically treated meltblown non-woven fabric layer may be 3 parts by weight to 50 parts by weight based on 100 parts by weight of the total weight of the non-woven fabric composite. When the amount of the electrostatically treated meltblown non-woven fabric layer is within this range, a non-woven fabric composite having excellent filtration performance, dimensional stability and durability may be obtained.

The non-woven fabric composite may have a basis weight (mass per unit area) of 10 $g/m^2$ to 500 $g/m^2$, for example, 20 $g/m^2$ to 100 $g/m^2$.

Hereinafter, the method of manufacturing the non-woven fabric composite according to an embodiment will be described in detail.

The method of manufacturing the non-woven fabric composite according to an embodiment includes a step of continuously forming a spunbond non-woven fabric layer (S10) and a step of continuously forming a meltblown non-woven fabric layer on the spunbond non-woven fabric layer (S20).

In the step of continuously forming the spunbond non-woven fabric layer (S10), a thermoplastic non-conductive polymer is subjected to melt-extruding, cooling, and stretching to form a fiber yarn, and then the fiber yarn is stacked on a screen belt to perform a web forming.

In the step of continuously forming the meltblown non-woven fabric layer (S20), a thermoplastic non-conductive polymer and an electrostatical performance enhancer are melt-extruded, hot-air stretched, and cooled to form a fiber yarn, and then, the fiber yarn may be stacked on the spunbond which is web-formed in the step of continuously forming the spunbond non-woven fabric layer (S10) to form a web.

For example, the step of continuously forming the meltblown non-woven fabric layer (S20) may include a step of continuously forming free fibers with a non-conductive polymer (S20-1), a step of continuously spinning the free fibers (S20-2), a step of continuously spraying a polar solvent (for example, water) onto the free fibers to continuously charge the free fibers (S20-3), and a step of continuously integrating the free fibers to continuously form a meltblown non-woven fabric (S20-4).

The step of continuously charging the free fibers (S20-3) may be performed by continuously spraying the polar solvent together with a gas (for example, air) onto the free fiber.

Hereinafter, it will be described in detail that the step of continuously charging the free fibers (S20-3) has a heterogeneous or significant effect compared to the prior art.

(1) Generally, as a method in which an electrostatical treatment is performed during the meltblown process, the method disclosed in U.S. Pat. No. 6,375,886 in which the electrostatical treatment is performed through friction between a polar solvent and a filament during melt spinning, and the method disclosed in U.S. Pat. No. 6,969,484 in which the meltblown non-woven fabric is immersed in a polar solvent and during water permeates through the non-woven fabric by using a suction device, the electrostatical treatment is performed through friction between water and the non-woven fabric, are mainly applied in the industry to prepare an electrostatically treated meltblown non-woven fabric. The electrostatical treatment method using a polar solvent requires a separate post-process of drying the polar solvent after the electrostatical treatment, and therefore, it is fundamentally impossible to laminate the plurality of non-woven fabrics or make a non-woven fabric composite using the plurality of non-woven fabrics in a continuous process. U.S. Pat. Nos. 6,375,886 and 6,969,484 are incorporated herein by reference in their entirety.

(2) U.S. Pat. No. 5,227,172 discloses a method in which a high potential difference is applied between a meltblown die and a collector so that the melt-spun resin is filamentized and inductively electrostatically treated by the surrounding electric field. In this method, an electrostatically treated meltblown non-woven fabric can be obtained without a separate post-processing. However, in the case of the non-woven fabric inductively charged by the electric potential difference, the electrostatical treatment efficiency thereof is rapidly reduced depending on heat or the surrounding environment. Accordingly, it is difficult to apply the inductively charged non-woven fabric to applications that require long-term storage in the sales process, such as a mask for removing fine dust, or that require a long service life, such as an air purifier filter. U.S. Pat. No. 5,227,172 is incorporated herein by reference in its entirety.

The inventors of the present application developed an electrostatical treatment device in which a polar solvent is sprayed in two-fluid form together with air on the meltblown non-woven fabric layer, and the polar solvent particles having sufficient kinetic energy with a small spray amount is caused to have friction with the filament being melt-spun to have a high-efficiency triboelectric effect. Since sufficient heating and evaporation may occur within the die-to-collector distance (DCD) section due to a small spray amount, a separate drying facility is not needed. Due to these characteristics, in combination with the non-woven fabric manufacturing process, the non-woven fabric by continuous stacking may be formed as composite.

The non-woven fabric obtained by charging the meltblown non-woven fabric is in a continuously polarized state so that negative and positive charges exist semi-permanently, and this non-woven fabric is called an electret non-woven fabric.

As described above, the method of manufacturing the non-woven fabric composite may not include a separate drying process for removing the polar solvent sprayed in the step of continuously charging the free fibers (S20-3).

In addition, as described above, the polar solvent continuously sprayed in the step of continuously charging the free fibers (S20-3), may be continuously heated by air heated within the DCD section of a non-woven fabric composite manufacturing apparatus and may evaporate.

The method of manufacturing the non-woven fabric composite may further include a step of continuously forming another spunbond non-woven fabric layer on the meltblown non-woven fabric layer (S30).

The method of manufacturing the non-woven fabric composite may further include a step of continuously thermocompressing the spunbond non-woven fabric layer on one or both sides of the meltblown non-woven fabric layer (S40) after the step of continuously forming the meltblown non-woven fabric layer (S20) and the step of continuously forming the other spunbond non-woven fabric layer (S30).

Hereinafter, an article according to an embodiment will be described in detail.

An article according to an embodiment may include the above-described non-woven fabric composite.

The article may be a mask for removing fine dust, a filter for an air purifier, or a filter for an air conditioner.

Hereinafter, the disclosure will be described in more detail through examples. These examples are for explaining the disclosure in more detail, and the scope of the disclosure is not limited to these examples.

Example 1: Preparation of Non-Woven Fabric Composite

A propylene homopolymer (LG Chemical, H7900) having a melt index (MI) of 34 g/10 min was used as a polymer for forming a spunbond non-woven fabric layer (SB), and a resin (LG Chem, H7910) having an index (MFR) of 1000 g/10 min was used as a polymer for forming a meltblown non-woven fabric layer. In addition, Chimasorb 944, which is a hindered amine light stabilizer, was added in an amount of 0.5 wt % to the polymer for forming the meltblown non-woven fabric layer (MB). Thereafter, a non-woven fabric composite in the form of spunbond-meltblown-spunbond (SMS) was continuously manufactured using the apparatus for manufacturing a non-woven fabric composite as shown in FIG. 1. Specifically, in the apparatus of manufacturing the non-woven fabric composite, the meltblown non-woven fabric layer (MB) was continuously subjected to an electrostatical treatment by being contacted with water together with air through a two-fluid nozzle, and then was stacked on the spunbond non-woven fabric layer (SB), and another spunbond non-woven fabric layer (SB) was stacked on the meltblown non-woven fabric layer (MB). As a result, an SMS non-woven fabric composite precursor was obtained. Thereafter, the SMS non-woven fabric composite precursor was manufactured in the form of a single non-woven fabric composite through a thermocompression process between a roll having an embossed pattern and a roll having no uneven structure. Here, the total basis weight of the SMS non-woven fabric composite was adjusted to be 100 gsm (g/m$^2$), and the basis weight of the meltblown non-woven fabric layer (MB) was adjusted to be 22 gsm.

Example 2: Preparation of Non-Woven Fabric Composite

An SMS non-woven fabric composite was prepared in the same manner as in Example 1, except that the total basis weight of the SMS non-woven fabric composite was adjusted to be 80 gsm and the basis weight of the meltblown non-woven fabric layer (MB) was adjusted to be 30 gsm.

Example 3: Preparation of Non-Woven Fabric Composite

An SMS non-woven fabric composite was prepared in the same manner as in Example 1, except that the total basis weight of the SMS non-woven fabric composite was adjusted to be 61 gsm and the basis weight of the meltblown non-woven fabric layer (MB) was adjusted to be 15 gsm.

Example 4: Preparation of Non-Woven Fabric Composite

An SMS non-woven fabric composite was prepared in the same manner as in Example 1, except that the total basis weight of the SMS non-woven fabric composite was adjusted to be 55 gsm and the basis weight of the meltblown non-woven fabric layer (MB) was adjusted to be 13 gsm.

Example 5: Preparation of Non-Woven Fabric Composite

An SMS non-woven fabric composite was prepared in the same manner as in Example 1, except that the total basis weight of the SMS non-woven fabric composite was adjusted to be 50 gsm and the basis weight of the meltblown non-woven fabric layer (MB) was adjusted to be 25 gsm.

Example 6: Preparation of Non-Woven Fabric Composite

An SMS non-woven fabric composite was prepared in the same manner as in Example 1, except that the total basis weight of the SMS non-woven fabric composite was adjusted to be 35 gsm and the basis weight of the meltblown non-woven fabric layer (MB) was adjusted to be 12 gsm.

Example 7: Preparation of Non-Woven Fabric Composite

An SMS non-woven fabric composite was prepared in the same manner as in Example 1, except that the total basis weight of the SMS non-woven fabric composite was adjusted to be 35 gsm and the basis weight of the meltblown non-woven fabric layer (MB) was adjusted to be 8 gsm.

Example 8: Preparation of Non-Woven Fabric Composite

An SMS non-woven fabric composite was prepared in the same manner as in Example 1, except that the total basis weight of the SMS non-woven fabric composite was adjusted to be 20 gsm and the basis weight of the meltblown non-woven fabric layer (MB) was adjusted to be 3 gsm.

Comparative Example 1: Preparation of Meltblown Single Non-Woven Fabric

A meltblown single non-woven fabric was prepared in the same manner as in Example 2, except that the spunbond non-woven fabric layer (SB) was omitted.

Comparative Example 2: Preparation of Non-Woven Fabric Composite

An SMS non-woven fabric composite was prepared in the same manner as in Example 3, except that the meltblown non-woven fabric layer (MB) was not electrostatically treated.

Comparative Example 3: Preparation of Meltblown Single Non-Woven Fabric

A meltblown single non-woven fabric was prepared in the same manner as in Example 3, except that the spunbond non-woven fabric layer (SB) was omitted.

Comparative Example 4: Preparation of Non-Woven Fabric Composite

An SMS non-woven fabric composite was prepared in the same manner as in Example 7, except that the meltblown non-woven fabric layer (MB) was not electrostatically treated.

Comparative Example 5: Preparation of Non-Woven Fabric Composite

An SMS non-woven fabric composite was prepared in the same manner as in Example 8, except that the meltblown non-woven fabric layer (MB) was not electrostatically treated.

Comparative Example 6: Preparation of Non-Woven Fabric Laminate

Two spunbond non-woven fabric layers (SB) and one meltblown non-woven fabric layer (MB) were separately prepared, and then bonded to each other to prepare an SMS non-woven fabric laminate. Here, the meltblown non-woven fabric layer (MB) was charged by using the charging method disclosed in U.S. Pat. No. 6,375,886. In addition, in the same manner as in Example 1, the total basis weight of the SMS non-woven fabric laminate was adjusted to be 100 gsm (g/m$^2$), and the basis weight of the meltblown non-woven fabric layer (MB) was adjusted to be 22 gsm.

Reference Example 1: Preparation of Non-Woven Fabric Laminate

An SMS non-woven fabric composite was prepared in the same manner as in Example 1, except that the meltblown non-woven fabric layer (MB) was charged by the charging method disclosed in U.S. Pat. No. 5,227,172.

Evaluation Example: Evaluation of Properties of Non-Woven Fabrics

The fine dust removal performance retention ratio and pressure loss retention ratio of each of the non-woven fabrics prepared in Examples 1 to 8, Comparative Examples 1 to 6 and Reference Example 1 were evaluated in the following manner. Results thereof are shown in Table 1.

(1) Measurement device: TSI-8130 model of TSI company was used.

(2) Formation of aerosol: By using the measurement device, the aqueous sodium chloride solution was brought into contact with air and then water was evaporated therefrom to form an aerosol that includes sodium chloride dispersed in air, and has an average particle diameter of 0.3 µm and a sodium chloride particle concentration of 18.5 mg/m$^3$.

(3) Evaluation of aerosol removal efficiency: The aerosol permeation flow rate was 95 L/min, and the evaluation area of the non-woven fabric was 100 cm$^2$.

(4) Pressure loss evaluation: The permeation flow rate of aerosol was 30 L/min, and the evaluation area of the non-woven fabric was 100 cm$^2$.

(5) Accelerated aging treatment: The non-woven fabric was stored in a dry oven at a temperature of 70° C. for 3 days.

(6) Aerosol removal efficiency and pressure loss were evaluated before and after accelerated aging treatment.

(7) The fine dust removal performance retention ratio and the pressure loss retention ratio were calculated according to Equation 1 or Equation 2.

TABLE 1

| | Aerosol removal efficiency (%) | | Fine dust | Pressure loss (mmAq) | | |
| --- | --- | --- | --- | --- | --- | --- |
| | Before accelerated aging treatment | After accelerated aging treatment | removal performance retention ratio (%) | Before accelerated aging treatment | After accelerated aging treatment | Pressure loss retention ratio (%) |
| Example 1 | 91.20 | 86.2 | 94.52 | 4.98 | 4.86 | 97.59 |
| Example 2 | 99.10 | 95.7 | 96.57 | 6.80 | 6.61 | 97.21 |
| Example 3 | 75.10 | 71.0 | 94.54 | 3.11 | 3.04 | 97.75 |
| Example 4 | 74.80 | 70.8 | 94.65 | 2.98 | 2.92 | 97.99 |
| Example 5 | 89.70 | 83.7 | 93.31 | 3.54 | 3.44 | 97.18 |
| Example 6 | 74.90 | 70.9 | 94.66 | 2.93 | 2.87 | 97.95 |
| Example 7 | 50.80 | 48.2 | 94.88 | 1.91 | 1.88 | 98.43 |
| Example 8 | 25.40 | 24.9 | 98.03 | 0.83 | 0.82 | 98.80 |
| Comparative Example 1 | 98.90 | 84.0 | 84.93 | 3.61 | 3.40 | 94.18 |
| Comparative Example 2 | 13.40 | 12.7 | 94.78 | 3.35 | 3.27 | 97.61 |
| Comparative Example 3 | 87.30 | 68.0 | 77.90 | 2.13 | 2.01 | 94.37 |
| Comparative Example 4 | 4.20 | 3.99 | 95.00 | 1.94 | 1.90 | 97.94 |
| Comparative Example 5 | 1.80 | 1.76 | 97.78 | 0.87 | 0.86 | 98.85 |
| Comparative Example 6 | 96.4 | 75.67 | 78.50 | 5.52 | 5.12 | 92.75 |
| Reference Example 1 | 84.5 | 43.26 | 51.20 | 5.59 | 5.50 | 98.51 |

Referring to Table 1, regarding each of the non-woven fabric composites prepared in Examples 1 to 8, a fine dust removal performance retention ratio and a pressure loss retention ratio were each 80% or more, and a fine dust removal performance retention ratio after accelerated aging treatment (that is, aerosol removal ratio) was 18% or more.

However, regarding the non-woven fabrics prepared in Comparative Examples 1 and 3, a pressure loss retention ratio was 90% or more and a fine dust removal ratio after accelerated aging treatment was 18% or more, but the fine dust removal performance retention ratio was less than 80%.

In addition, the non-woven fabrics prepared in Comparative Examples 2, 4 and 5, the fine dust removal performance retention ratio was 80% or more and the pressure loss retention ratio was 90% or more, but the fine dust removal ratio after the accelerated aging treatment was less than 18%.

In addition, regarding the non-woven fabric prepared in Comparative Example 6, a pressure loss retention ratio was 90% or more and a fine dust removal ratio after accelerated aging treatment was 18% or more, but the fine dust removal performance retention ratio was less than 80%.

In addition, regarding the non-woven fabric prepared in Reference Example 1, a pressure loss retention ratio was 90% or more and a fine dust removal ratio after accelerated aging treatment was 18% or more, but the fine dust removal performance retention ratio was less than 80%.

Although the disclosure has been described with reference to the drawings and examples, it will be understood that these are an example only, and that those of ordinary skill in the art can make various modifications and equivalent other embodiments therefrom. Accordingly, the true technical protection scope of the disclosure should be defined by the technical spirit of the appended claims.

The invention claimed is:

1. A non-woven fabric composite comprising:
an electrostatically treated meltblown non-woven fabric layer; and
a spunbond non-woven fabric layer on both sides of the electrostatically treated meltblown non-woven fabric layer,
wherein the meltblown non-woven fabric layer is electrostatically treated by being continuously subjected to an electrostatical treatment by being contacted with water together with air through a two-fluid nozzle in an apparatus of manufacturing the non-woven fabric composite,
wherein the non-woven fabric composite comprises a monolithic non-woven fabric manufactured according to such a method wherein two or more kinds of non-woven fabrics are prepared by using a single continuous process and thus integrally formed, wherein the non-woven fabric composite is not a non-woven fabric laminate manufactured through a separate laminating post-process after two or more kinds of non-woven fabrics are individually prepared,
wherein the non-woven fabric composite has a fine dust removal performance retention ratio of 80% or more, and the fine dust removal performance retention ratio is represented by Equation 1:

Fine dust removal performance retention ratio (%)= (fine dust removal efficiency after accelerated aging treatment)/(fine dust removal efficiency before accelerated aging treatment)×100  Equation 1 wherein, in the Equation 1, the fine dust is an aerosol containing sodium chloride dispersed in air, and the accelerated aging treatment refers to a case where the non-woven fabric composite is stored at a temperature of 70° C. for 3 days.

2. The non-woven fabric composite of claim 1, wherein the non-woven fabric composite has a pressure loss retention ratio of 90% or more, wherein the pressure loss retention ratio is represented by Equation 2:

Pressure loss retention ratio (%)=(pressure loss after accelerated aging treatment)/(pressure loss before accelerated aging treatment)×100  Equation 2 wherein, in the Equation 2, the pressure loss is measured using an aerosol containing sodium chloride dispersed in air, and the accelerated aging treatment refers to a case where the non-woven fabric composite is stored at a temperature of 70° C. for 3 days.

3. The non-woven fabric composite of claim 1, wherein the fine dust removal rate after the accelerated aging treatment is 18% to 99%.

4. The non-woven fabric composite of claim 1, wherein the electrostatically treated meltblown non-woven fabric layer and the spunbond non-woven fabric layer each independently include a non-conductive polymer, wherein the non-conductive polymer includes polyolefin, polystyrene, polycarbonate, polyester, polyamide, a copolymer thereof, or a combination thereof.

5. The non-woven fabric composite of claim 1, wherein an amount of the electrostatically treated meltblown non-woven fabric layer is 3 parts by weight to 50 parts by weight, based on 100 parts by weight of the total weight of the non-woven fabric composite.

6. An article comprising the non-woven fabric composite according to claim 1.

7. The article of claim 6, wherein the article is a mask for removing fine dust, a filter for an air purifier, or a filter for an air conditioner.

* * * * *